United States Patent [19]

Ono

[11] Patent Number: 5,016,704
[45] Date of Patent: May 21, 1991

[54] AIR CONDITIONER SYSTEM FOR AUTOMOTIVE VEHICLE

[75] Inventor: Hitoshi Ono, Kanagawa, Japan

[73] Assignee: Nissan Motor Company, Limited, Yokohama, Japan

[21] Appl. No.: 201,896

[22] Filed: Jun. 3, 1988

[30] Foreign Application Priority Data

Jun. 15, 1987 [JP] Japan .................................. 62-148358

[51] Int. Cl.⁵ .............................................. F24F 3/044
[52] U.S. Cl. ............................................ 165/1; 165/22; 165/42; 165/43; 165/76; 165/137; 237/12.3 A; 98/2.08
[58] Field of Search ................... 165/22, 41, 42, 43, 165/137, 76; 237/12.3 A, 12.3 B; 98/2.05, 2.08; 236/13

[56] References Cited

U.S. PATENT DOCUMENTS

| 4,289,195 | 9/1981 | Bellot et al. ............... 237/12.3 A |
| 4,523,633 | 6/1985 | Furukawa et al. .................. 165/41 |
| 4,537,245 | 8/1985 | Nishimura et al. ................. 165/22 |
| 4,582,252 | 4/1986 | Ogihara et al. .................. 98/2.08 |
| 4,718,244 | 1/1988 | Kobayashi .......................... 62/244 |

FOREIGN PATENT DOCUMENTS

58-79414  5/1983 Japan .
0202914  9/1986 Japan ........................... 237/12.3 A Primary Examiner—John Ford
Attorney, Agent, or Firm—Foley & Lardner, Schwartz, Jeffery, Schwaab, Mack, Blumenthal & Evans

[57] ABSTRACT

A heater unit of an automotive air conditioner includes a partition wall which separates a heater body into first and second air mix chambers, a communication path for communicating with the first and second air mix chambers, a separation door for closing or establishing the communication path and also for fully blocking or unblocking an air induction path of a conditioned air to be discharged into rear discharge outlets, and an arched shape communication duct for communicating with the second air mix chamber and a connecting member which is employed with the heater body and connected to a rear duct introduced into a rear seat side of a vehicular cabin. An independent temperature control type air conditioner in which the temperatures of conditioned air flowing through the first and second air mix chambers are independently controlled, may be modified to function as a standard type air conditioner in which the temperatures of conditioned air flowing through second air mix chamber are commonly controlled.

3 Claims, 7 Drawing Sheets

AIR CONDITIONER SYSTEM FOR AUTOMOTIVE VEHICLE

BACKGROUND OF THE INVENTION

1. Field of the Invention

The present invention relates generally to an air conditioner for an automotive vehicle which conditions air in a vehicular cabin. More specifically, the invention relates to an automotive air conditioner which is capable of temperature control for conditioned air to be discharged to the front and rear portions of the vehicular compartment independent of each other.

2. Description of the Prior Art

Recently, various automotive air conditioning systems for maintaining comfort in vehicular cabins, which include a heater unit, a cooler unit and an air mix chamber, have been proposed and put into the market.

Conventionally, in automotive air conditioning systems, temperature of conditioned air is controlled by adjusting amount of air to be passed through a heater core in the heater unit by adjusting an air mix door's angular position. The conditioned air is mixed in the air mix chamber and discharged into the vehicular cabin through a front vent and a rear vent. Recently, in order to better control the distribution of the air in the vehicular cabin, systems in which the temperatures of the conditioned air discharged from the front and rear air discharge outlets, are controlled independently.

One such automotive air conditioner has been disclosed in the Japanese Utility Model First Publication (Jikkai) Showa 58-79414.

The above independent temperature control automotive air conditioner has front and rear paths which are defined, by a partition wall or an air flow guide. The conditioned air is discharged through the front vent or the rear vent selectively by a separation door which is provided on the partition wall. However, the construction of this air conditioner is substantially different from that of a standard air conditioner in which paths of front and rear air discharge outlets are not separated from each other. As a result, the control vent assemblies of the two types of unit are not interchangeable. Therefore, two production lines are required in order to produce the two different types of assembly. This is expensive.

SUMMARY OF THE INVENTION

Therefore, it is an object of the disclosed invention to provide an automotive air conditioner system which may be used in both the standard and the independently controlled air conditioner systems.

In order to accomplish the aforementioned and other objects, an air conditioner system according to the present invention, comprises a separation door for closing and establishing a communication path between first and second air mix chambers defined in an air duct assembly, and a communication duct for communicating the second air mix chamber with a connecting member connected to a rear duct leading into the rear seat side of a vehicular cabin. The separation door and a section of a wall of the duct may be removed so as to make the heater unit suitable for installation in a standard type air conditioning system or left intact so as to be suitable for installation in an independent temperature control type air conditioning system. With the separation door and the communication duct removed, the amount of conditioning air to be discharged from front discharge outlets and rear discharge outlets is controlled by a first actuator means which is associated with a front defroster door, a front vent door, and a front foot vent door for operating these doors between a VENT mode position in which the front defroster door and the front foot door are fully closed and the front vent door is fully open, a BI-LEVEL mode position in which the front defroster door is fully closed and the front vent door and the front foot vent door are fully open, a HEATER mode position in which the front defroster door fully or half opens and the front vent door is fully closed and the front foot vent door is fully open, a DEF(DEFROST) mode position in which the front defroster door is fully open, and the front vent door and the front foot vent door are fully closed. The partition wall is formed with a removable section in which the separation door is mounted and the communication path is defined. Therefore, it is not required that all of the partition wall dividing the first and second air mix chambers defined in the air duct assembly be removed.

According to one aspect of the invention, an air conditioner system for an automotive vehicle comprises a conditioning air passage means having an air inlet for introducing air thereinto, the air passage means having a first discharge outlet directed to a front portion of a vehicular cabin for discharging a first conditioning air of first temperature therethrough and a second discharge outlet directed to a rear portion of the vehicular cabin for discharging a second conditioning air of second temperature therethrough, a cooling air source means disposed within the conditioning air passage means for cooling air introduced through the air inlet, a heating air source means disposed within the conditioning air passage means and downstream of the cooling air source means for introducing a controlled proportion of air introduced through the conditioning air passage means and including a heater unit for generating hot air, a cooling air passage means associated with the heating air source means for defining a passage, for passing cool air from the cooling air source means by-passing the heating air source means, a partitioning means disposed within the conditioning air passage means and downstream of the heating air source and defining a first chamber which is communicated with the heating air source means for introducing a controlled first proportion of hot air from the heating air source means and with the heating air source means for introducing a controlled second proportion of cool air for generating the first conditioning air, and a second chamber which is communicated with the heating air source means for introducing a controlled third proportion of hot air and with the cooling air passage means for introducing a controlled fourth proportion of cool air for forming the second conditioning air, the first chamber being communicated with the first discharge outlet for discharging the first conditioning air formed therein through the latter and the second chamber being communicated with the second conditioning air formed therein through the latter.

According to another aspect of the invention, an air conditioner system for an automotive vehicle comprises a conditioning air passage means having an air inlet for introducing air thereinto, the air passage means having a first discharge outlet directed to a front portion of a vehicular cabin for discharging a first conditioning air of first temperature therethrough and a second discharge outlet directed to a rear portion of the vehicular cabin for discharging a second conditioning air of second temperature therethrough, a cooling air source means disposed within the conditioning air passage means for cooling air introduced through the air inlet, a heating air source means disposed within the conditioning air passage means and downstream of the cooling air source means for introducing a controlled proportion of air introduced through the conditioning air passage means and including a heater unit for generating hot air, a cooling air passage means associated with the heating air source means for defining a passage, for passing cool air from the cooling air source means by-passing the heating air source means, a partitioning means detachably disposed within the conditioning air passage means and downstream of the heating air source and defining a first chamber which is communicated with the heating air source means for introducing a controlled first proportion of hot air from the heating air source means and with the heating air source means for introducing a controlled second proportion of cool air for generating the first conditioning air, and a second chamber which is communicated with the heating air source means for introducing a controlled third proportion of hot air and with the cooling air passage means for introducing a controlled fourth proportion of cool air for forming the second conditioning air, the first chamber being communicated with the first discharge outlet for discharging the first conditioning air formed therein through the latter and the second chamber being communicated with the second conditioning air formed therein through the latter.

According to another aspect of the invention, an air conditioner system for an automotive vehicle comprising, a conditioning air passage means having an air inlet for introducing air thereinto, the conditioning air passage means having a first discharge outlet directed to a front portion of a vehicular cabin for discharging a first conditioning air of first temperature therethrough and a second discharge outlet directed to a rear portion of the vehicular cabin for discharging a second conditioning air of second temperature therethrough, a cooling air source means disposed within the conditioning air passage means for cooling air introduced through the air inlet, a heating air source means disposed within the conditioning air passage means and downstream of the cooling air source means for introducing a controlled proportion of air introduced through the conditioning air passage means and including a heater unit for generating hot air, a cooling air passage means associated with the heating air source means for defining a passage, for passing cool air from the cooling air source means by-passing the heating air source means, a partitioning means disposed within the conditioning air passage means and downstream of the heating air source and defining a first chamber which is communicated with the heating air source means for introducing a controlled first proportion of hot air from the heating air source means and with the heating air source means for introducing a controlled second proportion of cool air for generating the first conditioning air, and a second chamber which is communicated with the heating air source means for introducing a controlled third proportion of hot air and with the cooling air passage means for introducing a controlled fourth proportion of cool air for forming the second conditioning air, the first chamber being communicated with the first discharge outlet for discharging the first conditioning air formed therein through the latter and the second chamber being communicated with the second conditioning air formed therein through the latter, and means for selectively operating the conditioning system in a first operation mode in which the first and second temperatures of conditioning air are controlled independently of each other and in a second operation mode in which the first and second temperatures of conditioning air are commonly controlled.

According to a further aspect of the invention, an air conditioner system for an automotive vehicle comprising a conditioning air passage means having an air inlet for introducing air thereinto, the conditioning air passage means having a first discharge outlet directed to a front portion of a vehicular cabin for discharging a first conditioning air of first temperature therethrough and a second discharge outlet directed to a rear portion of the vehicular cabin for discharging a second conditioning air of second temperature therethrough, a cooling air source means disposed within the conditioning air passage means for cooling air introduced through the air inlet, a heating air source means disposed within the conditioning air passage means and downstream of the cooling air source means for introducing a controlled proportion of air introduced through the conditioning air passage means and including a heater unit for generating hot air, a cooling air passage means associated with the heating air source means for defining a passage, for passing cool air from the cooling air source means by-passing the heating air source means, a partitioning means disposed within the conditioning air passage means and downstream of the heating air source and defining a first chamber which is communicated with the heating air source means for introducing a controlled first proportion of hot air from the heating air source means and with the heating air source means for introducing a controlled second proportion of cool air for generating the first conditioning air, and a second chamber which is communicated with the heating air source means for introducing a controlled third proportion of hot air and with the cooling air passage means for introducing a controlled fourth proportion of cool air for forming the second conditioning air, the first chamber being communicated with the first discharge outlet for discharging the first conditioning air formed therein through the latter and the second chamber being communicated with the second conditioning air formed therein through the latter, and a communication duct means for communicating the second chamber with the second discharge outlet, the communication duct means for selectively operating the conditioning system in a first operation mode in which the first and second temperatures of conditioning air are controlled independently of each other and in a second operation mode in which the first and second temperatures of conditioning air are commonly controlled.

According to a still further aspect of the invention, in an air conditioner system for an automotive vehicle comprising a conditioning air passage means having an air inlet for introducing air thereinto, the conditioning air passage means having a first discharge outlet directed to a front portion of a vehicular cabin for discharging a first conditioning air of a controlled temperature therethrough and a second discharge outlet directed to a rear portion of the vehicular cabin for discharging a second conditioning air of a controlled temperature therethrough, a cooling air source means disposed within the conditioning air passage means for cooling air introduced through the air inlet, a heating air source means disposed within the conditioning air passage means and downstream of the cooling air source means for introducing a controlled proportion of air introduced through the conditioning air passage means and including a heater unit for generating hot air, a cooling air passage means associated with the heating air source means for defining a passage, for passing cool air from the cooling air source means by-passing the heating air source means, and an air mixing system incorporated in the conditioning air passage means for forming the conditioning air comprising, means for defining an air mix chamber at an orientation downstream of the heating air source means in communication therewith and in communication with the cooling air passage means for introducing hot air from the heating air source means and cool air from the cooling air passage means, the air mix chamber being communicating with the first and second discharge outlets, means, inserted within the air mix chamber communicated with the first discharge outlet and a second chamber communicated with the second discharge outlet, each of the first and second chambers being communicated with the heating air source means and the cooling air passage means for introducing respectively controlled proportions of heating air and cooling air to adjust conditioning air temperature independently of each other.

BRIEF DESCRIPTION OF THE DRAWINGS

The foregoing and other features and advantages of the disclosed invention will be apparent from the detailed description contained hereinbelow and taken in conjunction with the accompanying drawings of the preferred embodiment of the invention, which should not be taken to limit the invention but are for explanation and understanding only.

In the drawings.

DESCRIPTION OF THE PREFERRED EMBODIMENT

Figure 1:
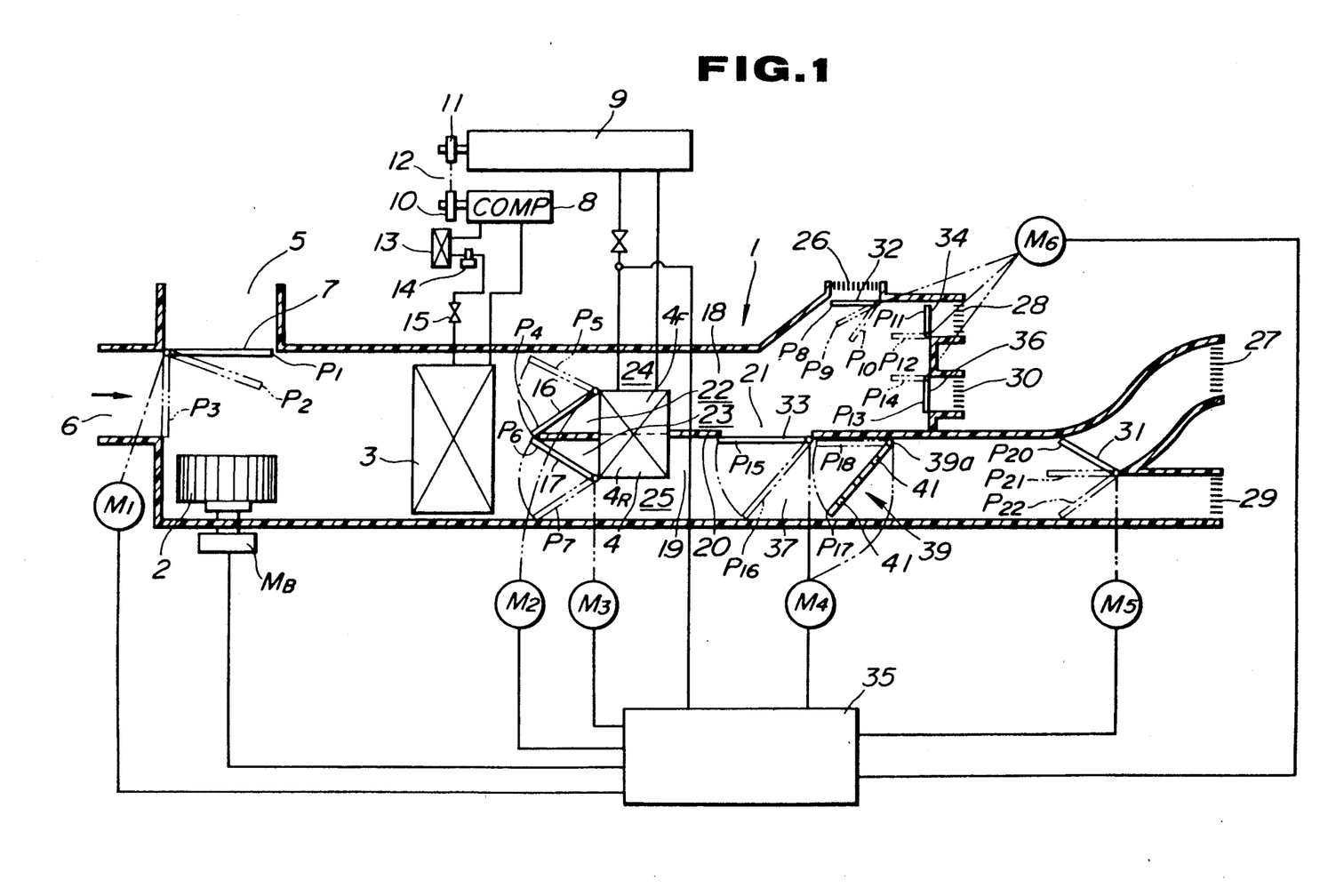
FIG. 1 is an explanatory view of the independent temperature control type air conditioner of the preferred embodiment.

Referring now to the drawings in detail, FIG. 1 is a plan view of the preferred embodiment of an independent temperature control type air conditioner. The independent temperature control type air conditioner includes a conditioned air duct assembly 1. A duct body of the air duct assembly 1 houses a blower unit 2, an evaporator 3, and a heater core 4. Air inlets 5 and 6 are defined in the duct body. The air inlet 5 is exposed to the outside of the vehicle body for drawing in fresh air. The air inlet 5 will be referred to as a "fresh air inlet". On the other hand, the air inlet 6 draws air from the vehicular cabin. The air inlet 6 will be referred to as a "recirculation inlet". The fresh air inlet 5 and the recirculation inlet 6 are selectively opened and closed by means of an air intake door 7. The air intake door 7 is hinged on the wall of the duct body in which the blower unit 2 is mounted. The air intake door 7 is operated between a fresh air mode position $P_3$ and a recirculation mode position $P_1$. Namely, the air intake door 7 selectively closes the fresh air inlet 5 and the recirculation inlet 6. At the fresh air mode position $P_3$, the air intake door 7 closes the recirculation inlet 6. On the other hand, at the recirculation mode position $P_1$, the intake door 7 closes the fresh air inlet 5. The intake door 7 is operative to a fresh/recirculation mixture mode position $P_2$ in which both of the fresh air inlet 5 and the recirculation inlet 6 are partially opened to introduce mixture of the fresh air and recirculation air. The angular position of the intake door 7 is adjusted by means of an actuator motor $M_1$. The blower unit 2 is constituted of a blower motor $M_B$ and a blower. The blower is cooperatively associated with the blower motor $M_B$ to be driven at a controlled speed.

The evaporator 3 is disposed within the air duct body for cooling air introduced through the fresh air inlet 5 and/or the recirculation inlet 6. The evaporator 3 is cooperated with a compressor 8 which is driven by an engine 9. Torque produced by the engine 9 is supplied to the compressor 8 through a belt 12 which engages a pulley 10 installed on the shaft of the compressor 8 and a pulley 11 installed on the shaft of the engine 9. Refrigerant gas is compressed in the compressor 8 and transmitted into a condenser 13. The refrigerant gas is changed from gas state to liquid state within the condenser 13 and temporarily stored in a liquid tank 14. High-pressure refrigerant is provided from the condenser 13 liquid tank 14 to an expansion valve 15, in which the high-pressure refrigerant expands and changes to a mist of low-pressure refrigerant. The low-pressure refrigerant is transmitted into the evaporator 3. Heat is drawn from the air around the evaporator 3 into the low-pressure refrigerant. As a result, air which passes through the evaporator 3, is cooled. The low-pressure refrigerant is changed from the liquid state to a gas state, and fed into the compressor 8. Refrigerant is circulated between the evaporator 3, compressor 8, liquid tank 14, and expansion valve 15 by way of conduits.

The heater core 4 is disposed downstream of the evaporator 3. The heater core 4 is so arranged as to have its air inlet and air outlet substantially aligned along the air flow. This arrangement minimizes the interference of the heater core with the air flow. Engine coolant is used as the heating medium in the heater core 4. The temperature of heating medium changes depending upon temperature of the engine coolant. In the independent temperature control type air conditioner shown in FIG. 1, a heater unit including the heater core 4 is so designed as to facilitate independently controlled dual air flows so that the amounts of conditioned air discharged at the front and rear sections of the vehicular cabin can be controlled independently of each other.

For this purpose, the heater core 4 is separated into a front heating chamber $4_F$ and a rear heating chamber $4_R$. The outlet of the front heating chamber $4_F$ is communicated with an air mix chamber 18 which will be hereinafter referred to as a "front air mix chamber". Likewise, the air outlet of the rear heating chamber $4_R$ is communicated with an air mix chamber 19 which will be hereinafter referred to as a "rear air mix chamber".

A partition wall 20 is provided for separating the heating chambers $4_F$ and $4_R$. The partition wall 20 also separates the air mix chambers 18 and 19. The partition wall 20 is formed with a communication path 21 for communicating between the front air mix chamber 18 and rear air mix chamber 19. The partition wall 20 defines an air induction path 22 for the front heating chamber $4_F$ through which a controlled amount of conditioned air can be introduced into the front heating chamber $4_F$. Similarly, the partition wall 20 defines an air induction path 23 for the rear heating chamber $4_R$ through which a controlled amount of conditioned air may be introduced into the rear heating chamber $4_R$. On the other hand, an air induction path 24 is defined between the heater core 4 and the peripheral wall of the front air mix chamber 18 through which cooled air from the evaporator 3 can enter the front air mix chamber 18. Another air induction path 25 is defined between the heater core 4 and the peripheral wall of the rear air mix chamber 19 through which cooled air from the evaporator 3 can be introduced into the rear air mix chamber 19. The inlets of the air induction paths 22 and 24 are openably closed by means of a front air mix door 16. The inlets of the air induction paths 23 and 25 are openably closed by means of a rear air mix door 17. The front and rear air mix doors are hinged on door mounts of the heater core 4. The front air mix door 16 is movable between a full cool mode position $P_4$ as shown by solid line in FIG. 1, where the air induction path 22 is fully closed and the air induction path 24 is fully open, and a full hot mode position $P_5$ shown by the broken line in FIG. 1, where the air induction path 24 is fully closed and the air induction path 22 is fully open. Likewise, the rear air mix door 17 is movable between a full cool mode position $P_6$ shown by solid line in FIG. 1, where the air induction path 23 is fully closed and the induction path 25 is fully open, and a full hot mode position $P_7$ where the air induction path 23 is fully open and the air induction path 25 is fully closed.

In the full cool mode positions $P_4$ and $P_6$, the cooled air from the evaporator 3 is supplied into the front and rear air mix chambers 18, 19 through the air induction paths 24, 25 without passing through the heater core 4. Conversely, in the full hot mode positions $P_5$ and $P_7$, the cooled air from the evaporator 3 is supplied into the two air mix chambers through the air induction paths 22, 23 so as to pass through the heating chambers $4_F$, $4_R$, respectively. Between the full cool mode position and the full hot mode position, the front and rear air mix doors 16, 17 are independently operated for controlling the angular positions thereof by means of an actuator motor $M_2$, $M_3$, respectively. In this way, the angular positions of the two air mix doors are independently changed in order to independently adjust proportion of the cool air and the hot air to be introduced into the air mix chambers 18, 19, respectively. The front air mix chamber 18 is communicated with a front defroster nozzle 26, a front vent 28, and a front foot vent 30. On the other hand, the rear air mix chamber 19 is communicated with a rear vent 27 and a rear foot vent 29.

The front defroster nozzle 26 is openably closed by means of a front defroster door 32. The front vent 28 and front foot vent 30 are provided with a front vent door 34 and a front foot vent door 36, respectively. The angular positions of these doors 32, 34, and 36 are controlled by means of an actuator motor $M_6$. Also, the rear vent 27 and rear foot vent 29 are selectively opened and closed by means of a rear vent door 31. The desired angular position of the rear vent door 31 is controlled by means of an actuator, motor $M_5$ for adjusting the amount of conditioned air to be discharged from the rear vent 27 and the conditioned air to be discharged from the rear foot vent 29. Further, a separation door 33 is hinged on the partition wall 20 for openably closing the communication path 21 and for blocking and establishing communication between the front and rear air mix chambers 18, 19. The angular position of the separation door 33 is controlled by means of an actuator motor $M_4$.

The aforementioned actuator motors $M_1$, $M_2$, $M_3$, $M_4$, $M_5$, $M_6$, and the blower motor $M_B$ are so controlled as to adjust the air flows from the front defroster nozzle, front vent, front foot vent, rear vent, and rear foot vent by means of a control unit 35 which produces control signals based on sensor signals produced by a set of sensors which may include a cabin temperature sensor, an ambient temperature sensor, an insolation sensor, an engine coolant temperature sensor, a discharge air temperature sensor, and so forth.

As shown in FIG. 1, the front defroster door 32 is operated between a fully closed position $P_8$ and a fully open position $P_{10}$. At the fully closed position $P_8$, the front defroster door 32 prevents conditioned from being discharged from the front defroster nozzle 26. On the other hand, at the fully open position $P_{10}$, the front defroster door 32 is fully open for conditioned air to be discharged from the front defroster nozzle 26. The front defroster door 32 may also be actuated to a partially open position $P_9$ in which the amount of conditioning air to be discharged from the front defroster nozzle 26 is partially restricted.

The front vent door 34 can be operated between a fully closed position $P_{11}$ and a fully open position $P_{12}$. At the fully closed position $P_{11}$, the front vent door 34 blocks conditioned air from being discharged the front vent 28. At the fully open position $P_{12}$, the front vent door 34 allows conditioned air to be discharged from the front vent 28. The front foot vent door 36 may be operated between a fully closed position $P_{13}$ a fully open position $P_{14}$. At the fully closed position $P_{13}$, the front foot vent door 36 blocks conditioned air from being discharged from the front foot vent 30. At the fully open position $P_{14}$, the front foot vent door 36 allows conditioned air to be discharged from the front foot vent 30.

The rear vent door 31 is operated between a rear vent mode position $P_{22}$ and a rear foot vent mode position $P_{20}$. The rear vent door 31 may also be operated to a rear vent and rear foot vent mode position $P_{21}$ in which both the rear vent and the rear foot vent are open for simultaneously discharging conditioned air. In the rear vent mode position $P_{22}$, the rear vent 27 is fully open and the rear foot vent 22 is fully closed. In the rear foot vent mode position $P_{20}$, the rear vent 27 is fully closed and the rear foot vent 22 is fully open.

The separation door 33 may be operated between position $P_{15}$ and position $P_{16}$. At the position $P_{15}$, the separation door 33 closes the communication path 21, so that all of the conditioned air in the rear air mix chamber 19 is introduced into the rear vent 27 and/or the rear foot vent 29 through the rear vent door 31. At the position $P_{16}$, the separation door 33 closes the air induction path 37, so that all of the conditioned air in the rear air mix chamber 19 is introduced into the front defroster nozzle 26, the front vent 28 and/or the front foot vent 30 through the respective doors 32, 34, and 36.

Midway between the separation door 33 and the rear vent door 31, a control door 39 having a plurality of holes 41 is so arranged as to control the amount of conditioned air to be discharged from the rear vent 27 and/or the rear foot vent 29. The control door 39 can be operated between position $P_{17}$ and position $P_{18}$ by means of the actuator motor $M_4$.

Figure 2:
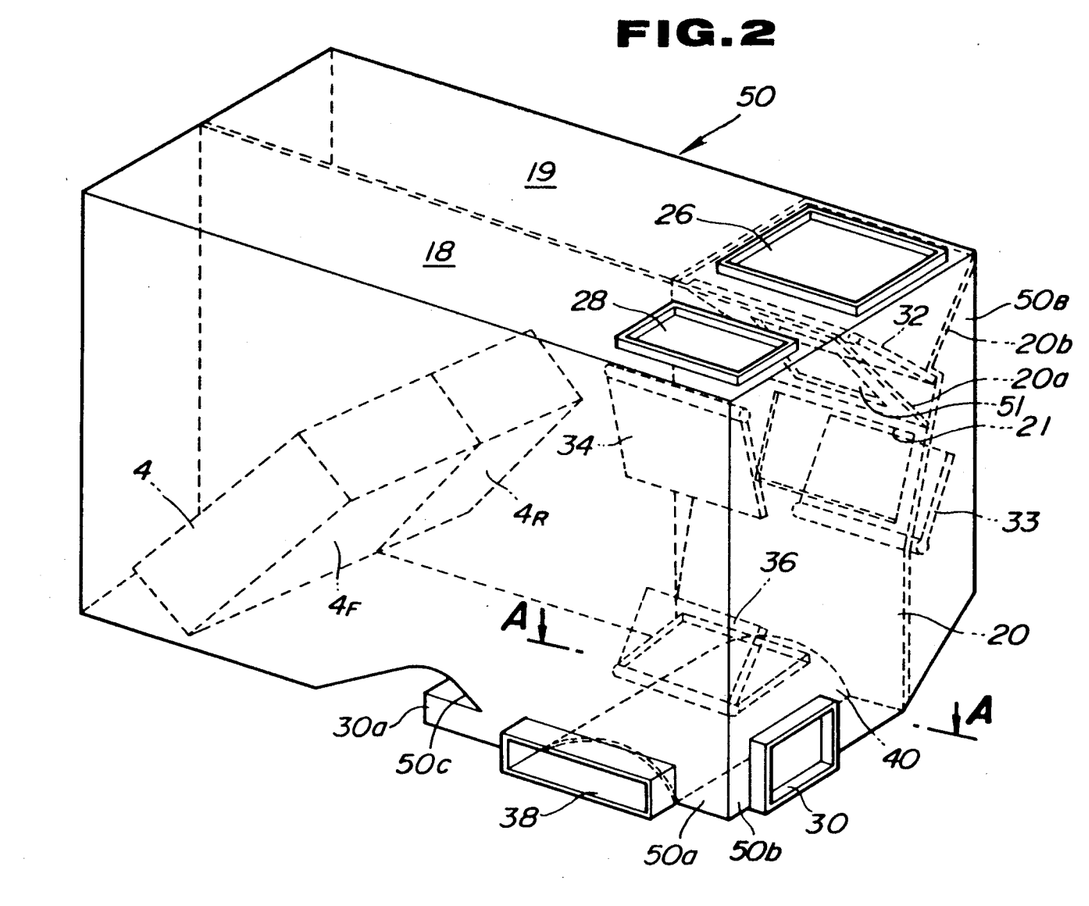
FIG. 2 is a perspective view of the preferred embodiment of a heater unit of the air conditioner according to the present invention.
Figure 3:
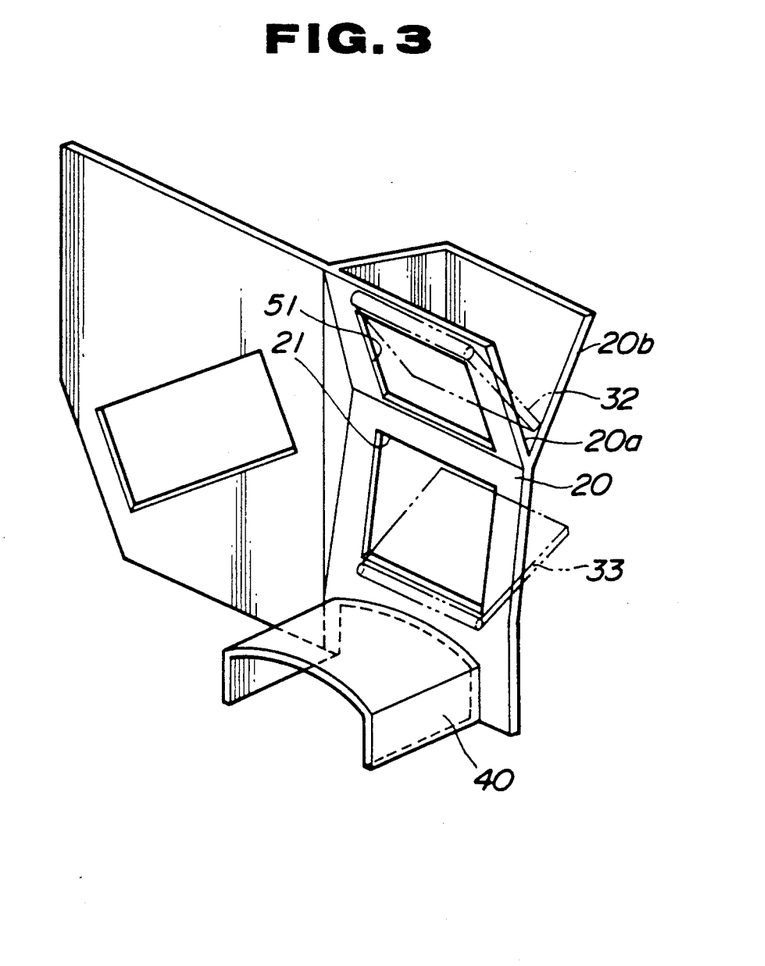
FIG. 3 is a perspective view of the partition wall for use in an independent temperature control type air conditioner of the invention.
Figure 5:
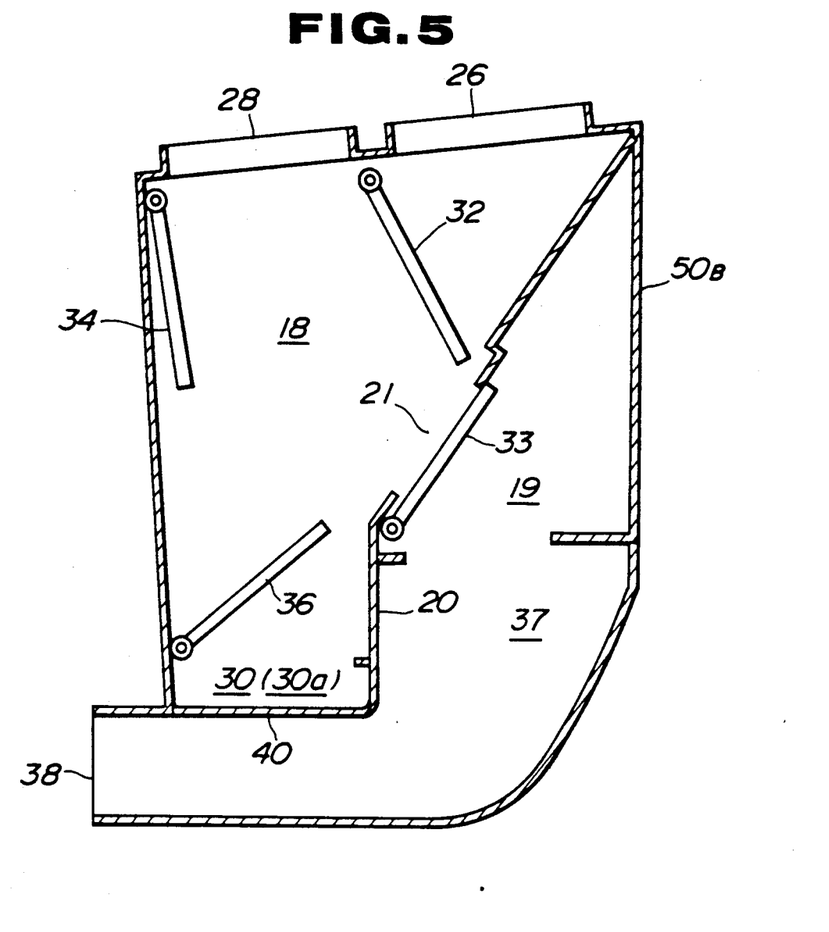
FIG. 5 is a sectional view taken on line B—B of FIG. 4.
Figure 6:
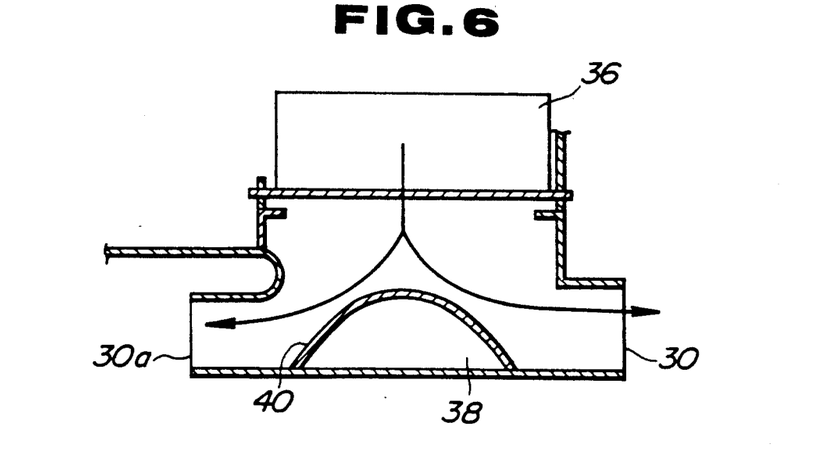
FIG. 6 is a sectional view taken on line A—A of FIG. 2.
Figure 7:
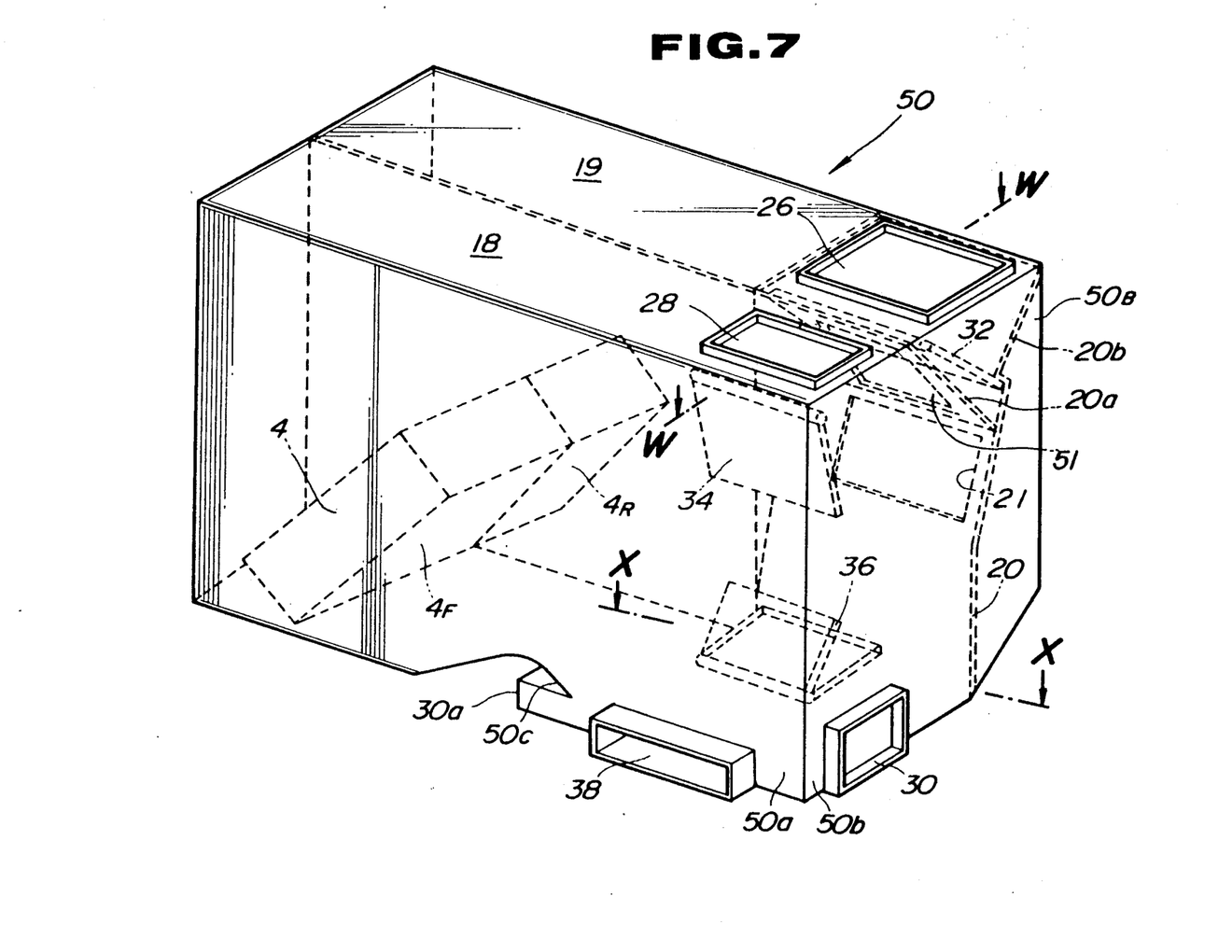
FIG. 7 is a perspective view of a heater unit for the standard type air conditioner.

FIGS. 2 and 3 show a heater housing $50_B$ of a heater unit 50 according to the preferred embodiment of the invention. An internal space defined in the heater housing $50_B$ is separated into the front air mix chamber 18 and the rear air mix chamber 19 by means of the partition wall 20 mentioned above. The partition wall 20 is formed with a first inclined face 20a and a second inclined face 20b which form a substantially V shaped structure in the vicinity of the front defroster nozzle 26. The first inclined face 20a is formed with a big opening 51 which is openably closed by the front defroster door 32. The front vent 28 and the front defroster nozzle 26 are formed in the upper side of the heater housing $50_B$. The first front foot vent 30 is disposed in a second side wall 50b of the heater housing $50_B$ for discharging conditioned air into the driver seat side. The second front foot vent 30a is disposed in a third side wall 50c of the heater housing $50_B$ for discharging the conditioned air into the passenger seat side. A rear vent connecting member 38 is disposed in a first side wall 50a by which a rear duct (not shown) may be connected with a removable, arched communication duct 40. At its other end, the communication duct 40 is connected to the rear air mix chamber 19. The arched construction of the communication duct 40 allows the conditioned air passing through the front foot vent door 36 to be uniformly distributed between the first front foot vent 30 and the second front foot vent 30a as shown in FIGS. 5 and 6. The rear vent connecting member 38 is communicated with the rear vent 27 and the rear foot vent 29 via the rear duct.

Figure 4:
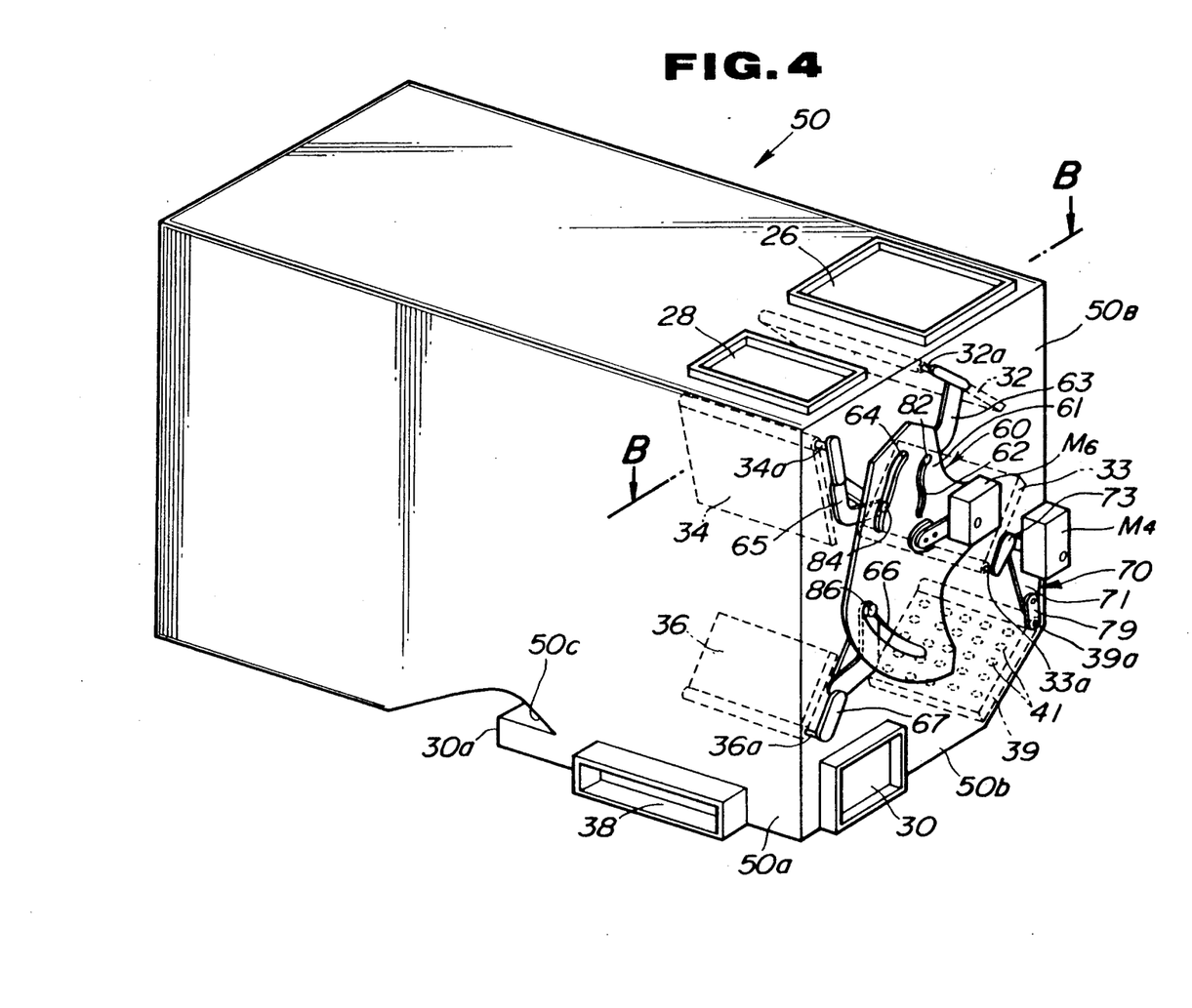
FIG. 4 is a perspective view of the heater unit representing a linkage of the heater unit of the air conditioner system according to the invention.

FIG. 4 shows two actuation mechanisms which include the actuator motors $M_4$ and $M_6$ for operating the doors to the respective desired angular positions. The respective doors 32, 33, 34, 36, and 39 are illustrated by the broken line in FIG. 4. In the preferred embodiment, the front defroster door 32, the front vent door 34, and the front foot vent door 36 are designed to be operated in synchronism with each other. The separation door 33 and the control door 39 are also designed to be operated in synchronism with each other. For synchronous operation of the doors 32, 34, and 36, a first linkage system 60 is provided with the first actuation mechanism. Similarly, for synchronous operation of the doors 33 and 39, a second linkage system 70 is provided with the second actuation mechanism. The first and second linkage systems 60 and 70 have respective link plates 61 and 71 pivotably or rotatably mounted on the second side wall 50b of the heater housing $50_B$. The first link plate 61 has three elongated openings 62, 64, and 66, which function as cams. The elongated opening 62 is slidingly engaged with a projection 82 formed on one end of a lever 63 which is rigidly secured to a pivot shaft 32a of the front defroster door 32. The elongated opening 64 is slidingly engaged with a projection 84 formed in one end of a lever 65 which is rigidly secured to a pivot shaft 34a of the front vent door 34. The elongated opening 66 is slidingly engaged with a projection 86 formed on one end of a lever 67 which is rigidly secured to a pivot shaft 36a of the front foot vent door 36. On the other hand, the second link plate 71 has two levers 73 and 79 pivotably supported at its opposite ends. The other end of the lever 73 is firmly secured to a pivot shaft 33a of the separation door 33. The other end of the lever 79 is firmly secured to a pivot shaft 39a of the control door 39.

The above pivot shafts 32a, 33a, 34a, 36a, and 39a are substantially parallel to the first side wall 50a of the heater housing $50_B$. Further, these pivot shafts are slightly projected from the second side wall 50b of the heater housing $50_B$ and are rotatably supported by the respective inner peripheral surfaces of holes bored in the second side wall 50b of the heater body $50_B$. Upon rotation of the first link plate 61, the elongated openings 62, 64, and 66 are in cooperation with levers 63, 65, and 67 rotate the front defroster door 32, the front vent door 34, and the front foot vent door 36 to the respective angular positions corresponding to the selected operation mode of the air conditioner which may be the VENT mode, BI-LEVEL mode, HEATER mode, or DEF (defroster) mode. Rotation of the second link plate 71, actuates the levers 73 and 79 to move the separation door 33 and the control door 39 to the respective angular positions corresponding to the operation mode of the air conditioner which may be the open mode, half-fully open mode, or fully closed mode. In the fully closed mode, the separation door 33 is set in position $P_{15}$ so as to close the communication path 21, and the control door 39 is set in position $P_{18}$ so as to minimize flow resistance against the conditioning air being introduced into the rear vent connecting member 38. At the half-open mode, the separation door 33 is set in position $P_{15}$ so as to close the communication path 21, and the control door 39 is set in the position $P_{17}$ as to introduce the minimum amount of conditioning air through the holes 41 thereof into the rear vent connecting member 38. At the fully open mode, the separation door 33 is set in position $P_{16}$ so as to fully open the communication path 21 and to introduce all of the conditioning air of the rear air mix chamber 19 into the front air mix chamber 18, and simultaneously closes the air induction path 37 to the rear vent 27 and the rear foot vent 29.

As will be appreciated( from the above, when the separation door 33 is actuated the fully open mode position $P_{16}$, all of the conditioning air is supplied to the front air mix chamber 18 through the communication path 21. Therefore, with this arrangement of the heater unit of the preferred embodiment, the air conditioner system is operated among VENT mode, BI-LEVEL mode, HEATER mode, and DEF (defroster) mode. Namely, in VENT mode, where the front defroster door 32, the front vent door 34 and the front foot vent door 36 are set in positions $P_8$, $P_{12}$ and $P_{13}$, respectively, conditioned air is discharged from the front vent 28. At BI-LEVEL mode, where the front defroster door 32, the front vent door 34, and the front foot vent door 36 are set in positions $P_8$, $P_{12}$ and $P_{14}$, respectively, the conditioned air is discharged from the front vent 28 and the front foot vents 30 and 30a. In HEATER mode, where the front defroster door 32, the front vent door 34, and the front foot vent door 36 are set in positions, P$_9$ or P$_{10}$, P$_{11}$ and P$_{14}$, respectively, the conditioned air is discharged from the front defroster nozzle 26 and the front foot vents 30, 30a. In DEF mode, where the front defroster door 32, the front vent door 34, the front foot vent door 36 are set in the positions P$_{10}$, P$_{11}$ and P$_{13}$, respectively, the conditioned air is discharged from the front defroster nozzle 26.

On the other hand, when the separation door 33 is actuated to the fully closed mode position P$_{15}$, the conditioned air flows independently into the front air mix chamber 18 and the rear air mix chamber 19. Particularly, in the rear air mix chamber 19, the conditioned air flows into the rear vent connecting member 38 through the rear vent communication duct 40.

Figures 8, 9, 10:
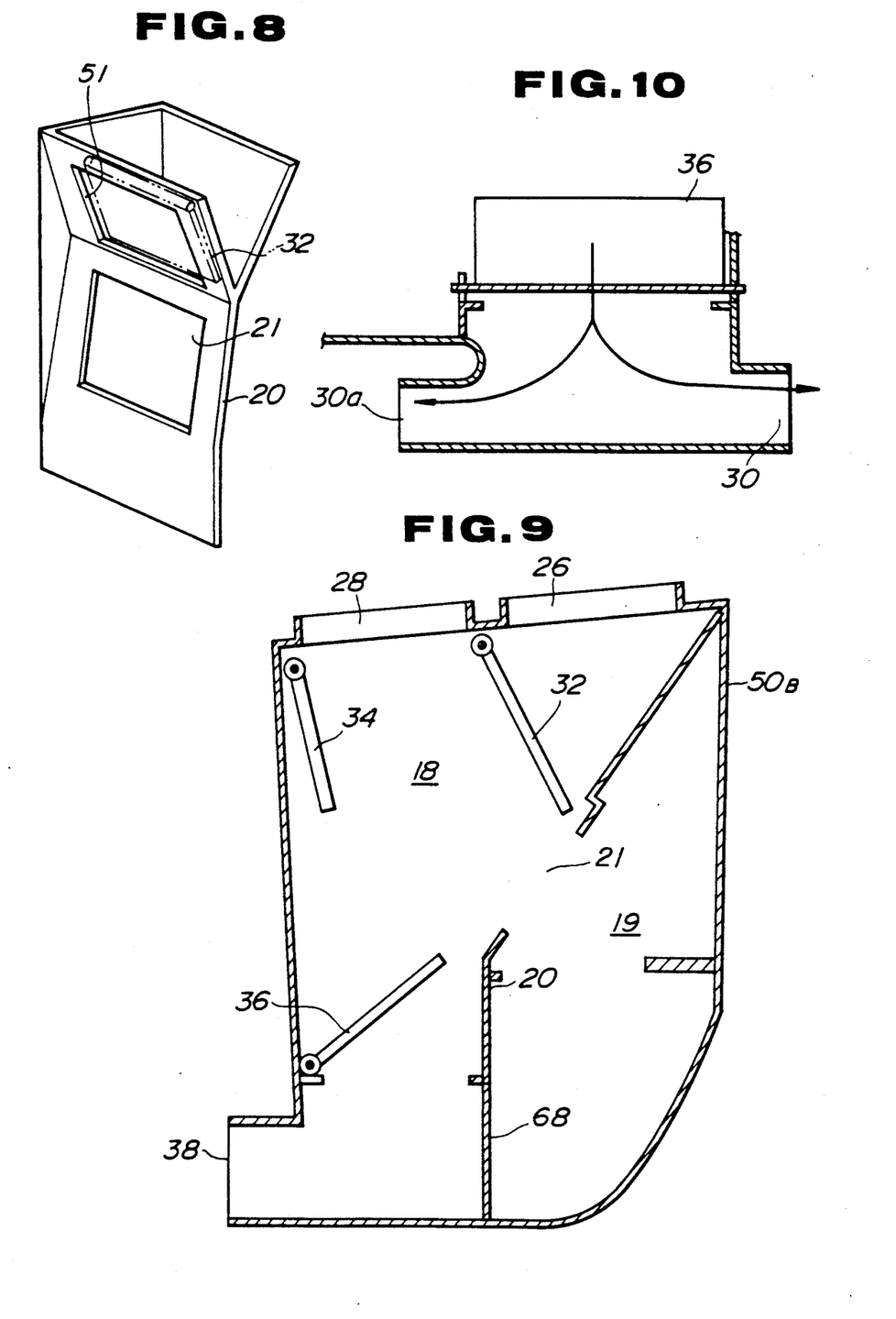
FIG. 8 is a perspective view of the partition wall employed in the standard type air conditioner
FIG. 9 is a sectional view taken along line W—W of FIG. 7.
FIG. 10 is a sectional view taken along line X—X of FIG. 7.

An independent temperature control type air conditioner having the heater unit of the invention, in which the temperatures of conditioned air flowing through the front and rear air mix chambers are independently controlled, can be changed to a standard type air conditioner which is not separated into front and rear air mix chambers, as shown in FIGS. 7, 8, 9, and 10. The change from the independent temperature control type air conditioner to the standard type air conditioner in which the temperatures of conditioned air flowing through the front and rear air mix chambers are commonly controlled, is performed by simply removing the separation door 33, the rear vent communication duct 40 and by adding a small position wall 68 as shown in FIG. 9, or by replacing the partition wall 20 as shown in FIG 8.

In the preferred embodiment, design changes between the independent temperature control type and the standard type are as follows:

The separation door 33 is removed from the partition wall 20 with the result that the communication path 21 is always fully opened. The arched communication duct 40, which is disposed between the surface of the partition wall 20 facing the front air mix chamber 18 and the inner surface of the first side wall 50a of the heater housing 50$_B$ facing the front air mix chamber 18, is removed from the partition wall 20. As shown in FIG. 9, a small partition wall addition 68 is installed in the lower portion of the partition wall 20 so as to prevent direct communication between the rear air mix chamber and the rear duct having the rear discharge outlets 27. Although it is not shown in FIG. 1 for the purpose of simplification of the drawing, by removal of the communication duct 40 and the separation door 33 and installation of the small partition wall 68, all conditioned air in the rear air mix chamber 19 is always introduced via the front air mix chamber 18 through the front foot vent door 36 to the connecting member 38 connected to the rear duct having the rear discharge outlets 27 and/or 29, as best shown in FIG. 9.

Also, the partition wall 20 may be a two split type of partition wall which comprises a first partition member for mounting the heater core thereon and positioned upstream of the air passage in the heater unit 50. A standard second partition member formed with the openings 21 and 51 including the separation door 33 and the defroster door 32 installed thereon as shown in FIG. 3. The standard second partition member may be replaced with another second partition member not having the separation door 33 or the communication duct 40 as shown in FIG. 8. According to this construction, when the heater unit is changed from the independent temperature control type to the standard type, all of the conditioning air in the rear air mix chamber 19 flows into the front air mix chamber 18 through the communication path 21, and further introduced into the front foot vents 30, 30a, and the rear vent connecting member 38 depending upon the angular position of the front foot vent door 36, or into the front defroster nozzle 26 and the front vent 28 depending upon the respective angular positions of the front defroster door 32 and the front vent door 34. That is, when an air conditioner system with a heater unit according to the invention is changed from the independent temperature control type to the standard type it operates according to the control signal from the control unit 35 as follows:

In VENT mode, the front vent door 34 is fully opened, and the front defroster door 32 and the front foot vent door 36 are fully closed, with the result that all of the conditioned air is discharged from the front vent 28.

In VI-LEVEL mode, the front vent door 34 is fully opened, the front foot vent door 36 is opened, and the front defroster door 32 is fully closed, and further the rear vent door 31 is actuated to the position P$_{20}$ in accordance with the control signal from the control unit 35 with the result that conditioned air with a relatively low temperature is discharged from the front vent 28, and conditioned air with a relatively high temperature is discharged from the two front foot vents 30 and 30a, and the rear foot vent 29.

In HEATER mode, the front foot vent door 36 is fully opened, the defroster door 32 is opened, the front foot vent door 36 is fully closed, and the rear vent door 31 is actuated to the position P$_{20}$ in accordance with the control signal with the result that conditioned air is discharged from the front foot vents 30 and 30a, the defroster nozzle 26, and the rear foot vent 29.

In DEF mode, the defroster door 32 is fully opened, the front vent door 34 and the front foot vent door 36 are fully closed, with the result that all conditioned air is discharged from the defroster nozzle 26.

As set forth above, by slight design changes, the heater unit of the invention is applicable not only for independent temperature control type air conditioners wherein the temperatures of conditioned air passing through the first and second air mix chambers are independently controlled, but also for standard type air conditioners wherein the temperature of conditioned air passing through the first and second air mix chambers are commonly controlled.

As will be appreciated from the above, since an independent temperature control type air conditioner having the heater unit of the invention can be changed into a standard type air conditioner by simply removing and adding a few parts which are included in the heater unit, either an independent temperature control type air conditioner or a standard type air conditioner can be constructed by making or not making simple alterations to the vent structure of the heater unit.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A method of assembling an air conditioner system for an automotive vehicle compartment comprising:

providing a partition means for dividing an internal space defined in a conditioning air duct into front and rear air mix chambers, said partition means defining front and rear conditioning air paths respectively communicated to outlets in front and rear portions of the vehicle compartment;

further providing a communication path means for communicating between said front and rear air mix chambers, said communication path means being formed in said partition means; and further providing either one of two exchangeable replacement parts (A) or (B), wherein (A) is a first exchangeable part comprising a portion of said partition means which includes a separation door associated with said communication path means operable between a first position in which said separation door fully closes said communication path means and said front and rear air mix chambers are independent and separate from one another, and a second position in which said separation door fully opens said communication path and blocks said rear conditioning air path defined within said rear air mix chamber and a communication duct means for communicating said rear air mix chamber with a connecting member which is provided on said conditioning air duct connected to a rear duct for introducing conditioning air into a rear discharge outlet; and (B) is a second exchangeable part comprising a portion of said partition means which includes a small partition wall section inserted so as to prevent direct communication between said rear air mix chamber and said rear duct having said rear discharge outlet.

2. A method of assembling an air conditioner for automotive vehicles comprising:

providing duct means having at least one air inlet for introducing air therein to, said duct means having a first discharge outlet directed to a front portion of the vehicle compartment for discharging conditioned air of a first temperature therethrough, said first discharge outlet including a front vent opening, a defroster opening, and a front foot vent opening, said duct means also including a second discharge outlet directed to a rear portion of a vehicle compartment for discharging conditioned air of a second temperature therethrough;

further providing air cooling source means disposed within said duct means for cooling air introduced through said at least one air inlet;

further providing air heating source means disposed within said duct means and downstream of said air cooling source means, said air heating source including a first temperature adjusting means for controlling a first temperature and a second temperature adjusting means for controlling a second temperature, said first and second temperature adjusting means having a heat exchanger for heating air passing therethrough;

further providing first and second cooled air passage means, associated with said duct means and said air heating source means for respectively defining first and second bypasses, for passing cooled air which is generated by said air cooling source means and which bypasses said air heating source means;

further providing partition means for dividing an internal space defined in said duct means into a first air mix chamber, communicated with said first temperature adjusting means and said first cooled air passage means, for generating said conditioned air of said first temperature, and a second air mix chamber, which is communicated with said second temperature adjusting means and said second cooled air passage means for generating said conditioned air of said second temperature, said first and second air mix chambers respectively communicating with said first and second discharge outlets in said front and rear portions of said vehicle compartment;

further providing first means for communicating between said first and second air mix chambers, said first means being formed in said partition means downstream of said air heating source means; and further providing either one of two exchangeable parts (A) or (B), wherein (A) is a first exchangeable part comprising a portion of said partition means which includes second means associated with said first means, said second means being operable in a first mode wherein said first and second temperatures are controlled independently of each other and in a second mode wherein said first and second temperatures are commonly controlled, a communication duct disposed within said first air mix chamber and having an aperture, a first passage through which conditioned air is directly introduced from said second air mix chamber to said second discharge outlet, and a second passage connecting said front foot vent opening to said first air mix chamber and (B) is a second exchangeable part comprising a portion of said partition means which includes a small partition wall section inserted so as to prevent direct introduction of conditioned air from second air mix chamber to said second discharge outlet.

3. The method of assembling an air conditioner as set forth in claim 2, wherein one end of said communication duct is connected to said partition means having a first communication opening, said communication duct communicating with said second air mix chamber via said aperture, located so as to connect therethrough, and the other end of said communication duct abuts a side wall of said duct means which defines said first air mix chamber in conjunction with said partition means, said side wall having a second communication opening which communicates said aperture with said second discharge outlet.

* * * * *